US012632360B2

(12) United States Patent
Zhang et al.

(10) Patent No.: US 12,632,360 B2
(45) Date of Patent: May 19, 2026

(54) METHODS AND DEVICES FOR ASSESSING GENERALIZABILITY OF BENCHMARKS

(71) Applicant: HUAWEI TECHNOLOGIES CO., LTD., Shenzhen (CN)

(72) Inventors: Haoxiang Zhang, Kingston (CA); Zhen Ming Jiang, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 745 days.

(21) Appl. No.: 17/465,118

(22) Filed: Sep. 2, 2021

(65) Prior Publication Data

US 2023/0070393 A1 Mar. 9, 2023

(51) Int. Cl.
| | |
|---|---|
| *G06F 11/34* | (2006.01) |
| *G06F 8/71* | (2018.01) |
| *G06F 8/77* | (2018.01) |
| *G06F 11/3698* | (2025.01) |

(52) U.S. Cl.
CPC ............ *G06F 11/3428* (2013.01); *G06F 8/71* (2013.01); *G06F 8/77* (2013.01); *G06F 11/3698* (2025.01)

(58) Field of Classification Search
CPC ............. G06F 11/3428; G06F 11/3476; G06F 11/3664; G06F 8/71; G06F 8/77
See application file for complete search history.

(56) References Cited

U.S. PATENT DOCUMENTS

| | | | | |
|---|---|---|---|---|
| 5,819,066 A | * | 10/1998 | Bromberg ........... | G06F 11/3428 |
| | | | | 706/920 |
| 7,007,270 B2 | * | 2/2006 | Martin ................ | G06F 11/3447 |
| | | | | 714/E11.197 |
| 7,188,101 B2 | * | 3/2007 | Smyth ................. | G06F 16/2458 |
| | | | | 707/999.005 |
| 8,423,986 B1 | * | 4/2013 | Grechanik .......... | G06F 11/3676 |
| | | | | 702/179 |
| 11,150,898 B1 | * | 10/2021 | Kesiboyana ..... | G06Q 10/06398 |
| 11,677,786 B1 | * | 6/2023 | Vashisht ............. | H04L 63/1433 |
| | | | | 726/22 |
| 2003/0066049 A1 | * | 4/2003 | Atwood .............. | G06F 11/3664 |
| | | | | 714/E11.22 |
| 2009/0007078 A1 | * | 1/2009 | Hoyek ................ | G06F 11/3688 |
| | | | | 717/131 |

(Continued)

OTHER PUBLICATIONS

Standard Performance Evaluation Corporation (SPEC), "SPEC Glossary," https://www.spec.org/spec/glossary//#benchmark, 2020, online; accessed Dec. 29, 2020.

(Continued)

*Primary Examiner* — Marina Lee

(57) ABSTRACT

There are provided methods and devices for assessing the generalizability of software benchmarks. The method includes selecting a benchmark for assessment and identifying a generalizability bias in the selected benchmark. The determination of a generalizability assessment for the selected benchmark can be based on the identified generalizability bias. Subsequently, the generalizability of the selected benchmark can be determined based on the determined generalizability assessment. A computing device is provided which includes a processor and a memory storing instructions, wherein when the instructions are executed by the processor the device can be configured to perform the above method.

14 Claims, 4 Drawing Sheets

(56) References Cited

U.S. PATENT DOCUMENTS

| | | | | |
|---|---|---|---|---|
| 2018/0374024 | A1* | 12/2018 | Cai | G06F 8/70 |
| 2022/0058513 | A1* | 2/2022 | John | G06V 10/7792 |
| 2022/0107799 | A1* | 4/2022 | Wu | G06F 16/24556 |
| 2023/0025441 | A1* | 1/2023 | Oguara | G06F 11/368 |
| 2024/0031261 | A1* | 1/2024 | Mukherjee | G06F 17/40 |
| 2025/0342360 | A1* | 11/2025 | Varerkar | G06N 3/088 |

OTHER PUBLICATIONS

R. K. Saha, Y. Lyu, W. Lam, H. Yoshida, and M. R. Prasad, "Bugs.jar: a large-scale, diverse dataset of real-world java bugs," in Proceedings of the 15th International Conference on Mining Software Repositories, 2018, pp. 10-13.

R. Just, D. Jalali, and M. D. Ernst, "Defects4j: A database of existing faults to enable controlled testing studies for java programs," in Proceedings of the 2014 International Symposium on Software Testing and Analysis, 2014, pp. 437-440.

M. Nagappan, T. Zimmermann, and C. Bird, "Diversity in software engineering research," in Proceedings of the 2013 9th joint meeting on foundations of software engineering, 2013, pp. 466-476.

C. Bird, A. Bachmann, E. Aune, J. Duffy, A. Bernstein, V. Filkov, and p. Devanbu, "Fair and balanced? bias in bug-fix datasets," in Proceedings of the 7th joint meeting of the European Software Engineering Conference and the ACM SIGSOFT Symposium on the Foundations of Software Engineering, 2009, pp. 121-130.

* cited by examiner

100

METHODS AND DEVICES FOR ASSESSING GENERALIZABILITY OF BENCHMARKS

CROSS-REFERENCE TO RELATED APPLICATIONS

This is the first application filed for the present disclosure.

FIELD

The present disclosure pertains to the field of software engineering and, in particular, to method and device for assessing the generalizability of benchmarks, for example software benchmarks.

BACKGROUND

A benchmark is usually a standard or a point of reference which can be used to compare one thing against another. A benchmark is an abstraction of the real world. It is important to ensure the generalizability of the benchmark, so the comparison results are accurate and effective. In computer science, a benchmark is generally used to compare the performance of one approach against another (e.g., a performance benchmark). For example, while evaluating the performance of computer systems, obtaining correct benchmarking results can be highly dependent on the quality of the benchmarks and the correctness of the experimental and analysis approaches.

To facilitate the comparison and future research in bug fixing, bug fix benchmarks which may be called software benchmarks have been created. Such software benchmarks or bug fix benchmarks are used to propose and evaluate the effectiveness of various automated program repair (APR) techniques. It can be important to ensure the generalizability (for example with respect to the diversity and the representativeness) of these bug fix benchmarks with respect to the overall bug population. In the context of bug fix benchmarks, diversity refers to the inclusion of different bug types, while representativeness refers to the preservation of the proportions of different bug types in the overall bug population. Therefore, if a bug fix benchmark is not diverse, the APR techniques developed under such bug fix benchmarks may neglect certain types of bugs. Similarly, if a bug fix benchmark is not representative, the reported evaluation results among various APR techniques may not accurately represent the reality.

Due to the importance of benchmark data for the analysis of bug fixes, the quality of the data requires a detailed evaluation for potential data bias to be identified along the whole process of the benchmarking. Various studies have evaluated the generalizability during the selection of software development projects and/or assessed the generalizability of existing software engineering research works. Two dimensions of generalizability have commonly been presented, namely diversity and representativeness, for which measures have been proposed to evaluate the diversity aspects of the sampled software development projects among software engineering research in general. For evaluating the generalizability during the extraction of the bug fix, the systematic bias of bug fix datasets have been explored to understand whether the datasets are a fair representation of the bug fix population. Unfortunately, there is a lack of systematic assessment on the generalizability in the area of bug fix benchmarks or software benchmarks.

Accordingly, there is a need for techniques that can address one or more limitations of the above-mentioned art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods and devices for assessing the generalizability of benchmarks for example software benchmarks.

It can be important to ensure the generalizability of benchmarks, so that the proposed techniques and findings on such benchmarks may be applicable in practice. Embodiments of the present disclosure propose an assessment framework which can quantitatively measure the diversity, the representativeness, and the overall generalizability coverage of benchmarks.

An aspect of the present disclosure provides a method for assessing the generalizability of a benchmark. The method includes selecting a benchmark for assessment and identifying a generalizability bias in the selected benchmark. The method further includes determining a generalizability assessment for the selected benchmark based on the identified generalizability bias, and then the generalizability of the selected benchmark is determined based on the determined generalizability assessment.

In some embodiments of the present disclosure, the generalizability bias can be a diversity bias or a representativeness bias or both a diversity bias and a representative bias. In some embodiments of the present disclosure, the method further includes updating the selected benchmark based on the generalizability assessment. In addition, updating the selected benchmark may include sending a software commit to the selected benchmark based on the generalizability assessment. The software commit can be based on a code repository and a report of a software bug.

In some embodiments of the present disclosure, selecting the benchmark can be based on a popularity of the selected benchmark or a freshness of the selected benchmark or both a popularity and freshness of the selected benchmark. In some embodiments, the identification of the generalizability bias is based on information indicative of the selected benchmark or information indicative of guidance of the use of the selected benchmark or information indicative of both the selected benchmark and guidance of the use of the selected benchmark. In some embodiments, identification of the generalizability bias can further include defining a diversity measure for the benchmark or defining a representativeness measure for the benchmark or defining both a diversity measure and representative measure of the benchmark.

In some embodiments of the present disclosure, determining a generalizability assessment can include determining quantitative measures based on the identified generalizability bias. In some embodiments the quantitative measures are used to define a measure of benchmark generalizability. In some embodiments, the quantitative measures can be based on one or more of a number of lines of code for the selected benchmark, an application domain the selected benchmark, a number of commits for the selected benchmark, a priority level of a software bug in the selected benchmark, a number of days to fix a software bug in the selected benchmark, a code churn to fix a software bug in the selected benchmark and a measure of software development project level or bug level characteristics of interest.

Advantages of the present disclosure may include features wherein the framework may provide a measure to define how bugs along different characteristic dimensions diversely and representatively cover a plurality of bug fix activities throughout the benchmark creation processes.

Another aspect of the present disclosure provides for a computing device. The computing device includes a processor, and a non-transient computer readable memory having stored thereon machine executable instructions which when executed by the processor configure the device to execute the methods disclosed herein. For example, such a computing device can be configured to select a benchmark for assessment, identify a generalizability bias in the selected benchmark, determine a generalizability assessment for the selected benchmark based on the identified generalizability bias, and determine the generalizability of the selected benchmark based on the determined generalizability assessment.

In some embodiments of the present disclosure, the generalizability bias can be a diversity bias or a representativeness bias or both a diversity bias and a representative bias. In some embodiments of the present disclosure, the device if further configured to update the selected benchmark based on the generalizability assessment. In addition, updating the selected benchmark may include sending a software commit to the selected benchmark based on the generalizability assessment. The software commit can be based on a code repository and a report of a software bug.

In some embodiments of the present disclosure, the selection of the benchmark can be based on a popularity of the selected benchmark or a freshness of the selected benchmark or both a popularity and freshness of the selected benchmark. In some embodiments, the identification of the generalizability bias is based on information indicative of the selected benchmark or information indicative of guidance of the use of the selected benchmark or information indicative of both the selected benchmark and guidance of the use of the selected benchmark. In some embodiments, identification of the generalizability bias can further include defining a diversity measure for the benchmark or defining a representativeness measure for the benchmark or defining both a diversity measure and representative measure of the benchmark.

In some embodiments of the present disclosure, the device can be configured to determine a generalizability assessment by determining quantitative measures based on the identified generalizability bias. In some embodiments, the quantitative measures are used to define a measure of benchmark generalizability. In some embodiments, the quantitative measures can be based on one or more of a number of lines of code for the selected benchmark, an application domain the selected benchmark, a number of commits for the selected benchmark, a priority level of a software bug in the selected benchmark, a number of days to fix a software bug in the selected benchmark, a code churn to fix a software bug in the selected benchmark and a measure of software development project level or bug level characteristics of interest.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

The terms "software bug" and "bug" are interchangeably used herein to define an error, flaw or fault in a computer program or system that causes the computer program or system to produce an incorrect or unexpected result or to behave in unintended ways.

To mitigate the potential risk in benchmark generalizability, embodiments of the present disclosure propose a benchmark generalizability assessment framework to systematically measure the diversity (e.g., the inclusion of different data types) and representativeness (e.g., the preservation of the proportions of different data types) of a benchmark.

According to embodiments, the framework of benchmark generalizability assessment allows for additional processes to be inserted into the benchmark creation that are used to identify a generalizability bias, formulate generalizability assessment metrics, and evaluate the benchmark generalizability. The assessment of benchmark generalizability can lead to a variety of next steps including, but not limited to, updating and/or maintenance of the benchmark, determination of a new benchmark, identification of a cause of overfitting of data, and the identification of new research directions in the field of software benchmarking. Overfitting data can be defined as an analysis of data that corresponds too closely to a particular data set, and could therefore fail to fit additional data or reliably predict future observations.

According to embodiments, the framework of benchmark generalizability assessment may be leveraged by future researchers and practitioners to better understand the data they are using, and thus further improve benchmarking practices. Additionally, other software engineering areas (e.g., code cloning or software testing) may also leverage the framework according to embodiments, in order to assess and reduce the risk of generalizability while using various benchmark datasets along with the associated metrics of interested.

Figure 1:
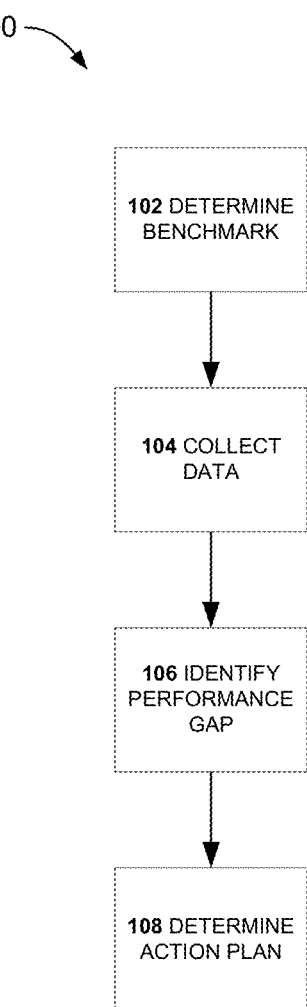
FIG. 1 depicts a flowchart for a benchmarking process, according to embodiments of the present disclosure.

Referring now to FIG. 1, the creation of a benchmark follows a general process 100 that facilitates the standardization of evaluating the performance of the systems being evaluated. At step 102, the scope of the benchmark is determined to define what is being evaluated by the benchmark. At step 104, data is collected to enable the evaluation of performance based on quantitative measures. Quantitative evaluation can further be used, at step 106, as method for identifying a performance gap. A performance gap may be taken to be the difference between the intended and the actual performance. Then, at step 108, action plans for the benchmark can be developed based on the performance gap of step 106. Developing action plans may involve selecting and/or implementing practices that can narrow the performance gap. For example, an action plan can be developed to improve an existing benchmark by selecting a subset of data according to the generalizability assessment. As another example an action plan can be developed to update an existing benchmark by adding in new data over time according to the generalizability assessment. In a further example, an action plan can be developed to create a new benchmark by collecting data according to the generalizability assessment.

Embodiments of the present disclosure address potential bias in benchmark generalizability by adding processes after data collection (step 104) and before the identification of the performance gap (step 106). As an example, data collection can include collecting measurements of the system for the purpose of comparing the performance of different technologies. In addition, data may be unstructured textual data for the purpose of information retrieval benchmark or bug and commit data for the purpose of bug fixing benchmarks. Data can be collected and processed with the benchmark generalizability assessment framework to ensure that the data used to evaluate performance has its generalizability quantitatively assessed. Quantitative assessment of benchmark generalizability can include measuring aspects such as the diversity and representativeness of the benchmark. For instance, the data diversity can be measured by the proportion of the range that the selected data covers. For example, a diversity of 100% indicates that the data samples cover a diverse range of the data population. In addition, as an example data representativeness can be measured by the similarity of the sample data and the population distributions. As an example, a representativeness of 100% indicates that the data samples resemble the distribution of the data population closely.

Figure 2:
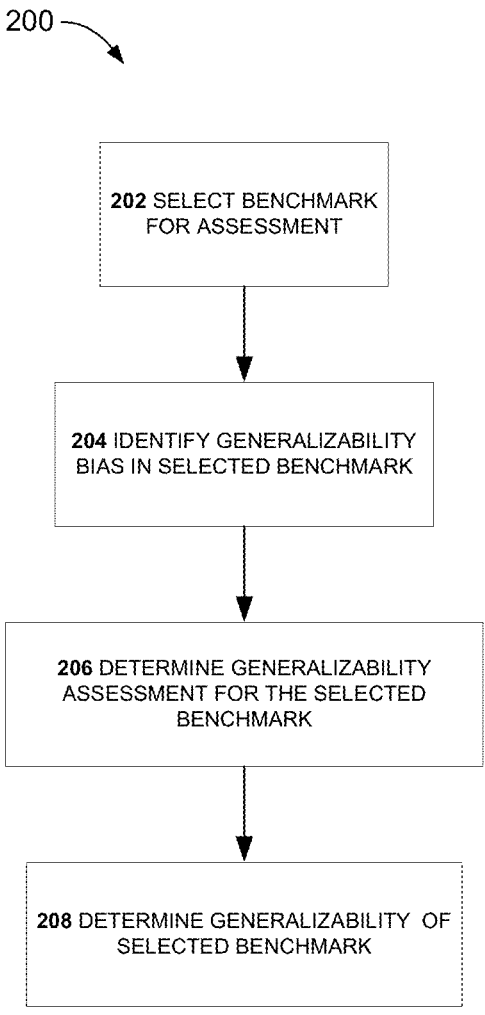
FIG. 2 depicts a flowchart of a method for a benchmark generalizability assessment framework, according to embodiments of the present disclosure.

FIG. 2 is flowchart of a method 200 for a benchmark generalizability assessment framework according to various embodiments of the present disclosure. A standardized process can be followed to generate a quantitative measure of the benchmark generalizability. The method 200 includes, at step 202, selecting at least one benchmark for assessment. This selection may be based on the popularity or freshness of the benchmark, or other merits that may be relevant in the usage of the benchmark. Popularity or freshness can be an element of search algorithms which gives greater weight to newer content over older content for certain search queries. For example, popularity can define how prevalent or commonly a benchmark is used by practitioners or in academia or in both. In addition, freshness can define whether a benchmark is old or has been recently constructed or developed. For example, the freshness of a software development project can be measured as how actively the software development project is modified. In addition, freshness can be indicative of the involvement of a software development project can be measured or determined based on how many maintainers are working on the software development project in recent time period. In addition, other merits can include extensibility and automation. Extensibility can define how easily a benchmark can be extended for potential future use and automation can define how a benchmark can be built in an automated manner. The method 200 further includes, at step 204, identifying a generalizability bias in the at least one selected benchmark. Generalizability bias can be used to define the bias in terms of the data generalizability. For example, a generalizability bias of data can define how the data that is sampled in a benchmark may not fully represent the whole data population, or how the data sampled in a benchmark may not cover all the ranges of the data population. Identification of a generalizability bias may be based on the benchmark documents and other sources of information that guide the use of the benchmarks being evaluated, for example standards that are shared by a community of interest. For example, the Defects4J benchmark may have associated publications relating to studies that have been performed using it, or it may have versioning documentation describing information such as the types of software bugs encountered. The method 200 further includes, at step 206, determining a generalizability assessment for the at least one selected benchmark based on the identified generalizability bias. Determining a generalizability assessment includes determining quantitative measures based on the identified generalizability bias that may be used to determine a score of benchmark generalizability. The score of benchmark generalizability may include, without limitation, an effect size, a cosine similarity, similarity measure, or combination of the foregoing. For example, an effect size, a cosine similarity, or other similarity measure can be used to measure or define representativeness. Furthermore, the diversity can be measured as the proportion of the data population that is covered by the sampled data. The method 200 further includes, at step 208, evaluating the generalizability for the at least one selected benchmark using the determined generalizability assessment.

In various embodiments the generalizability bias is at least one of a diversity bias, and a representativeness bias. To ensure the generalizability of a benchmark, it is important to ensure the diversity and representativeness of the benchmark datasets. An embodiment of the benchmark generalizability assessment framework in the context of software bug fixing is presented below.

A software bug is typically defined as a fault in a computer program, which causes the program to misbehave or operate outside of desired operational parameters during runtime. Depending on the bug severity, some bugs might impact usability or cause functionality problems, whereas other bugs may cause catastrophic failures (e.g., a system crash) or large financial losses. Some studies have indicated that software bugs may contribute to annual financial losses in the trillions of dollars. Hence, it is vital that software bugs are discovered and fixed as soon as possible. One general approach to addressing this challenge is through the process of automated program repair (APR). APR is a research area which focuses on automated detection and repairing of software bugs in the program without human intervention. In order to ensure the effectiveness of the techniques used during APR and the generalizability of the identification of software bugs, bug fix benchmarks can usually be used.

Prior studies have created bug fix benchmarks for controllable processes and datasets in facilitating program debugging/repair research. TABLE 1 depicts bug fix benchmarks across different programming languages that have been used as examples in understanding bug fix practices, and in evaluating APR.

7

TABLE 1

| Benchmark | Language |
| --- | --- |
| Defects4J | Java |
| Bugs.jar | Java |
| Bears | Java |
| BugSwarm | Java/Python |
| QuixBugs | Java/Python |
| ManyBugs/IntroClass | C |
| Codeflaws | C |
| CoREBench | C |
| DroixBench | Android |

For example, Defects4J is an extensible bug fix benchmark, for testing Java programs. The Defects4J benchmark collects five software development projects, for example five open source software projects, together with test suites to verify the bug fix. In addition, Bugs.jar is also used for benchmarking bug fixing of Java programs. Bugs.jar aims to provide a large-scale and diverse dataset of bugs and patches. The Bugs.jar benchmark is also run with a code coverage tool, a regression test tool and an automated program repair (APR) tool. The Bears benchmark is designed to automatically identify bugs and patches based on Continuous Integration (CI) builds. The Bears benchmark contains 251 bugs from 72 Java software development projects. Continuous Integration is the practice of automating the integration of code changes from multiple contributors into a single software development project. The BugSwarm benchmark was developed by leveraging Travis CI (a Continuous Integration service) that collects buggy code, failing regression tests, and bug fixes. The dataset contains 3,091 bug fixes in Java and Python and can be continuously expanded.

QuixBugs is a multi-language bug fix benchmark based on the Quixey Challenge (a type of coding challenge to solve a bug in a famous line of code). It contains 40 buggy programs in both Java and Python with passing/failing test cases. ManyBugs and IntroClass are benchmarks in C with 1,183 defects in 15 programs. The ManyBugs and IntroClass benchmark includes both large open-source software development projects and small programming assignments. The Codeflaws bug fix benchmark was created based on five defined criteria: diverse defects types, large number of programs/defects, algorithmically complex, and large test suite). The Codeflaws benchmark contains of 3,902 defects in 7,436 programs from CodeForces, a site for competitive programming contests. CoREBench includes 70 regression errors from four software development projects. Its creation is based on a selected 27 bugs from CoREBench and a compilation from developers' debugging practices. The creators of CoREBench also created DBGBench to provide insights on the human debugging process. DroixBench is a reproducible crash benchmark for Android applications. DroixBench contains 24 crashes that can be used to assess approaches to patch crashes in Android.

Embodiments of the present disclosure provide a method for the quantitative evaluation of the impact of bug fix benchmark generalizability bias in the Java programming language. It will be readily understood that this method of assessment may also be used in and applied to other programming languages. While a focus in the present disclosure relates to benchmarks in Java and examples of methods according to embodiments, it will be readily understood that other bug fix benchmarks (e.g., ManyBugs or Codeflaws in C) may also have different characteristics of their benchmark generalizability. As such, it will be readily understood that the method of the instant disclosure may equally be applied to the benchmark generalizability assessment of other programming languages.

Among the five Java-based bug fix benchmarks listed in TABLE 1, the benchmarks associated with Defects4J and Bugs.jar are discussed with respect to embodiments of the present disclosure. These two benchmarks are selected due to citation and traceability. With regard to citation, the highly cited Java-based benchmarks are selected as papers which reference these benchmarks may be used in associated case studies. For example, a first paper evaluated three unit test generators for bugs defined in the Defects4J dataset in order to understand how test generators can be improved to support better fault detection. Hence, the more cited the benchmarks for different uses, the greater the importance of those benchmarks and thus a desired generalizability of these benchmarks can be provided by embodiments of the present disclosure. Having regard to traceability, it is desired that information such as bugs and bug fixes be available in order to determine a generalizability assessment. Hence, software development project level information (e.g., type of software development projects) is required as well as the information for all the bugs and their fixes (i.e., the availability of bug reports and code repositories). Therefore, the benchmarks associated with Bears and BugSwarm have been excluded, as these benchmarks collect data from Travis CI with the fail-pass patterns not being guaranteed to actually be bug fixes (i.e., false positive bugs). QuixBugs is also excluded, as this benchmark lacks software development project-level information due to the nature of the benchmark of being an online programming competition (i.e., 40 buggy programs are given with a bug on a single line of each program).

The different bug extraction criteria that are used in both benchmarks (Defects4J and Bugs.jar) will be discussed as follows. In both Defects4J and Bugs.jar, issues with type=BUG (i.e., the issue is caused by a bug in the software) are explicitly selected to exclude other activities (such as fixing the build system, feature enhancement, documentation, and testing) that are unrelated to bug fixing. Then, a heuristic linking approach is applied for collecting bug fixes by leveraging both bug reports in issue tracking systems (ITS) and commits in version control systems (VCS). A "commit" in this sense is an operation which sends the latest changes of the source code to the repository of the software, making those particular changes part of the head revision of the repository, for example a desired correction for the software bug identified.

In Defects4J, the keyword for matching is "[SOFTWARE DEVELOPMENT PROJECT ABBREVIATION]—[BUG ID]" (e.g., MATH-123); while in Bugs.jar, the keyword for matching is "[BUG ID]" (e.g., 123). Bug fix benchmarks actively use the subset of bugs/commits by this heuristic approach of referencing a bug ID in a commit log. For example, guidelines have been defined for software developers to commit a patch, for example: "the commit message should include the JIRA issue id," where JIRA is a proprietary software issue tracking product. Therefore, a bug fix commit with a bug ID in the log can be linked to a fixed bug by its ID. However, this heuristic approach does not consider that all the bug fix commits are necessarily linked to all the fixed bugs. In a real-world scenario, a software developer may not include the bug ID in the commit log. Although in both Defects4J and Bugs.jar additional criteria is not applied in the step of bug selection, the heuristic linking approach between bugs and commits is not the only bug selection criteria in existence. For example, selection criteria may be based on an additional criterion to identify the closed bugs (i.e., the bug resolution status is either "closed" or "resolved"). When the closed bugs are not explicitly selected during benchmark creation processes, reopened bugs or other types of unresolved bugs can be included. In addition, an improved heuristic linking approach can define a connection between bugs and commits by an additional criterion that is based on the date when a bug was resolved and when the associated bug fix commit was made. After using a heuristic linking approach, a 7-day time window was used to further select bugs that have a recent bug fix commit. This criterion was observed to have a high recall in the bug selection process. Although there is some generalizability of the bug linking process is known, there remains a need for the generalizability of the bug fix benchmarking process.

Embodiments of the present disclosure provide a means for assessing the generalizability of the bug linking process, and can further provide a means for assessing the other processes associated with bug fixes. After bugs and commits are linked, bugs are further filtered if they are not associated with valid test cases. A collection of comprehensive and maintained test cases can provide the quality of a bug fix benchmark. For example, in Defects4J, an automated process is implemented to exclude from the test suite commits that fail. A further review process of the source code diff (e.g. a data comparison tool used to determine the differences between two pieces of software code) is also followed to exclude code changes that are related to features or refactorings. For example, code changes related to features can be representative of codes changes that are made to provide new features to existing software and code changes related to refactoring can be representative of code changes that are made to refactor the existing code base. Code refactoring is a process in software development used to edit and clean up written software without changing the function of the code at all. Similarly, Bugs.jar includes comprehensive and well-maintained test cases. Analysis of each bug is implemented to determine if a bug is a real bug. This filtering process performed after the bug/commit linking process, can introduce a potential data bias due to the coverage of testing cases or the quality of an examination. Thus, the collected bugs in the benchmark after the filtering process may not be as generalizable as the fixed bugs that are linked.

It should be noted that the data selection bias throughout the different steps (i.e., from linking to filtering) may have a compounding effect. This means that data selection bias is present at numerous steps along the overall path, further skewing the true data at each step, which then makes the skewing almost inseparable from the data itself. For example, data selection bias can define or representative of one or more of a potential bias relating to the selection of bugs/commits, a potential bias relating to the selection of linked bugs that are associated with bug fix commits and a potential bias relating to the selection of bugs/commits in the benchmark through manual validation and test cases.

Bug fix benchmarks use different criteria to select their software development projects and the associated bugs in these software development projects to represent the bug fix activities performed to correct the bug. Potential issues have been observed in the generalizability of some Java-based bug fix benchmarks. For example, it is unclear whether the linked fixed bugs can be representative of all the fixed bugs by the heuristic linking approach. While Defects4J uses the keyword "[SOFTWARE DEVELOPMENT PROJECT ABBREVIATION]—[BUG ID]", Bugs.jar uses the keyword "[BUG ID]" for linking bugs and commits. Furthermore, a potential issue of generalizability of the linking process can affect the assessment in the filtering process further. Hence, quantitative evaluation of the generalizability of these Java-based bug fix benchmarks is desired. Thus, in various embodiments formulating a generalizability assessment includes developing quantitative measures based on the identified generalizability bias. In some embodiments the quantitative measures are used to determine a measure of benchmark generalizability.

In some embodiments the quantitative measures to formulate a generalizability assessment include at least one of a number of lines of code of a software development project for the at least one benchmark, an application domain of a software development project for the at least one benchmark, a number of commits of a software development project for the at least one benchmark, a priority level of a software bug in the at least one benchmark, a number of days to fix a software bug in the at least one benchmark, and a code churn to fix a software bug in the at least one benchmark. Code churn is a metric which indicates how often a given piece of code gets edited. TABLE 2 depicts a selection of quantitative measures (or dimensions) used to assess the data selection bias. In some embodiments the quantitative measures are used to define a measure of benchmark generalizability. It is generally divided between the software development project level dimensions and software bug level dimensions (the BUSes). It should be noted that the software development project level dimensions are retained in order that the diversity measure covers as many aspects as possible. The software development project level dimensions are used to assess the diversity of the selected software development projects, for example to assess the generalizability of the BUSes.

TABLE 2

| Category | Dimension | Motivation |
|---|---|---|
| Software Development Project | LOC: Lines of code of a software development project. | LOC is a measure of software size. |
| | Domain: The application domain of a software development project. | Software development projects within different application domains may follow different bug fix practices. |
| | Commit count: The number of commits in a software development project. | Commit count is a measure of the activeness of a software development project. |
| Software Bug | Priority: The priority level of a bug. | Developers prioritize effort to fix critical bugs rather than trivial bugs. |
| | Resolution days: The number of days to fix a bug. | It requires more effort to fix a bug that takes a longer time. |
| | Code churn: The code churn to fix a bug. | A bug that requires more code churn to fix is more complex. |

Having regard to TABLE 2, the following defines features relating to LOC (i.e. Lines of code), commit count, priority, resolution day and code churn.

LOC is used to define the lines of code in a software development project. A software development project with a larger code base, for example more lines of code, can be considered to be more mature.

Domain—The application domain of a software development project. Different software development projects may be directed towards different application domains with different requirements. Bugs in one application domain can be different from bugs in another domain.

Commit count is used to define the number of commits in a software development project. A software development project with more commits can be considered to be more active in during development.

In addition to the software development project level characteristics, it can be further necessary to define the distributions of software bug characteristics in the bug fix context. The bias between the linked bugs and the overall bug population can be used to assess the generalizability of the benchmarks by comparing the bugs selected from the benchmarks and the entire bug populations.

Bug Priority is used to define the priority of a bug. For example a majority of the fixed bugs with high priority in a software development project indicate that the software development project contains bugs having a greater impact, while the majority of the fixed bugs with low priority in a software development project indicate that the software development project contains more nonessential bugs. The representativeness of bugs with different priority levels can therefore change throughout the benchmark creation process. It can be important to note whether the selected bugs in the linked bugs or in the benchmark resemble the distribution of all the fixed bugs in different priority levels.

Code Churn is used to define a feature representative of a bug fix effort that can be measured in terms of the code churn (i.e., an indication of how often a given piece of code gets edited, calculated as the sum of the added, modified and removed lines of code, in a bug fix commit). The majority of the bug fixes in a software development project with a large number of code churn indicate that the software development project contains bugs that require a high effort to fix, while the majority of the bug fixes in a software development project with a small number of code churn indicate that the software development project contains bugs that require a low effort to fix. It is desired to determine whether the linked bug fixes or the bug fixes in the benchmark resemble the distribution of all the bug fixes in terms of the code churn.

Resolution Time can be defined such that bugs that take a longer time to fix are more challenging due to the enduring effort. It is desired to determine whether the selected bugs in the linked bugs or in the benchmark resemble the distribution of all the fixed bugs in terms of the bug resolution time.

In some embodiments the method further includes at least one of performing an update of the selected at least one benchmark, and determining a new benchmark. Additionally, identification of a potential cause of overfitting of data, and the opening of new research directions in the field of software benchmarking may be possibilities.

Figure 3:
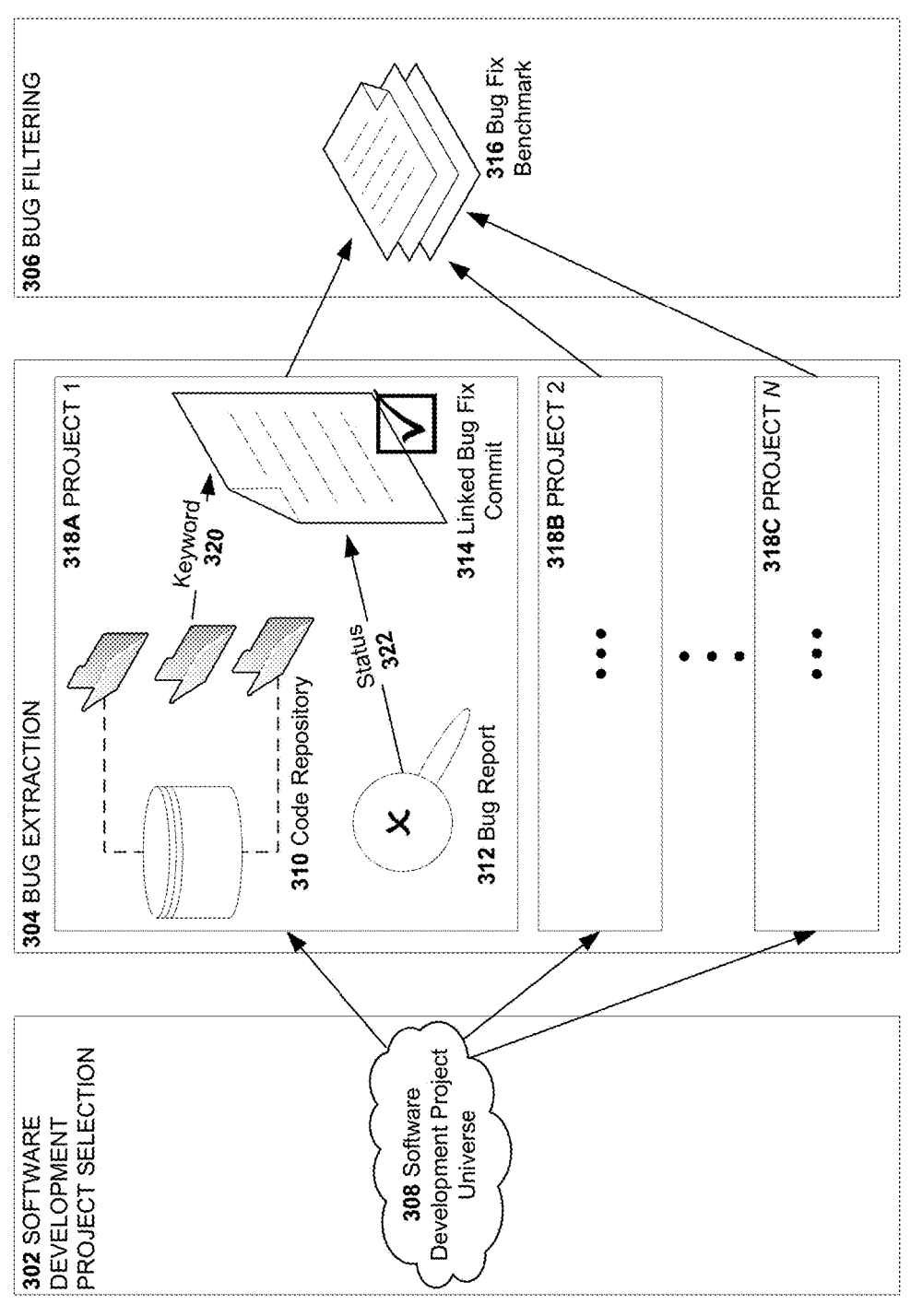
FIG. 3 depicts a schematic of the processes for creating a bug fix benchmark, according to embodiments of the present disclosure.

In order to assess the generalizability of bug fix benchmarks, measurements to characterize benchmark diversity and representativeness are disclosed. FIG. 3 depicts an example schematic 300 of the processes for creating a bug fix benchmark. As shown in FIG. 3, the Linked Bug Fix Commit 314 is only one portion of all the bug fix activities. In some embodiments performing an update to the selected at least one benchmark according to the generalizability assessment includes sending a software commit to the selected at least one benchmark, the software commit based on at least one code repository and at least one report of a software bug.

FIG. 3 is divided into three broad stages: Software Development Project Selection 302, Bug Extraction 304 and Bug Filtering 306. Bug fix activities are divided into different components in order to characterize the data selection bias through the benchmark creation processes. Benchmark generalizability can be affected by the processes themselves (as described above in relation to FIG. 1) that are involved with the benchmark creation. The benchmark generalizability is assessed in the bug fixing context. By analyzing the bug fix data throughout the benchmark creation processes, both the bug linking bias and bug filtering bias are observed. Thus, the benchmark bugs are not generalizable to all the bug fix activities throughout the benchmark creation processes.

Under the Software Development Project Selection 302 stage, software development projects may be selected from the Software Development Project Universe 308. In some embodiments selecting the at least one benchmark is based on at least one of a popularity of the selected at least one benchmark, a freshness of the at least one benchmark, and another merit relevant in a usage of the selected at least one benchmark. The selected software development projects (318A, 318B and 318C) are then passed to the Bug Extraction 304 stage. Project 1 318A, Project 2 318B and Project N 318C are listed under Bug Extraction 304 stage as examples. Using Project 1 318A as an example for deeper explanation, updated code information from Code Repository 310 and results from Bug Report 312 are used to send keywords 320 and status 322 to the Linked Bug Fix Commit 314. The Linked Bug Fix Commits 314 from the plurality of Projects (318A, 318B and 318C) may then be sent to the Bug Filtering 306 stage, where they form a part of the Bug Fix Benchmark 316. Equation 1 shows the bug fix activities in a benchmark $(d_0)$ and the compositions of all bug fix activities $(d_1 + d_2 + d_3)$:

$$\begin{cases} d_0\text{: bugs in the benchmark} \\ d_1\text{: bug fix commits that are not linked to any bug} \\ d_2\text{: fixed bugs that are not linked to any commit} \\ d_3\text{: fixed bugs that are linked to bug fix commits} \end{cases} \quad (1)$$

In some embodiments the identification of the potential generalizability includes at least one of determining a diversity measure (e.g. diversity score) for the at least one benchmark, and determining a representativeness measure (e.g. representative score) for the at least one benchmark. To quantitatively assess the two BUSes (e.g. software development project level and bug level), the metrics of diversity and representativeness are defined in order to evaluate the benchmark generalizability:

A diversity score is a measure used to evaluate the diversity of sample in the population. A measure called sample coverage has been used to identify the percentage of software development projects that are similar to given sampled software development projects in covering the whole software development project population. However, sample coverage is focused on software development project diversity. Embodiments of the present disclosure specifically focus on bug fixes. Further, previous approaches have been adapted for individual bugs. A quantitative measure for the coverage of bug fix benchmark can alleviate a potential data selection bias in creating a bug fix benchmark. The evaluation of existing benchmarks can with an understanding of how diverse and representative specific data can be when compared with real-world bug fix activities. Therefore, embodiments of the present disclosure extend the sample coverage from the diversity of software development projects to the diversity of bug fix activities. The diversity score $Div(d_0; d_i)$ can be determined as defined in Equation 2 with both software development project and bug dimensions for three bug fix data components.

$$\begin{cases} Div(d_0, d_1) \sim (LOC + \text{Project Domain} + \text{Commit Count}) + (\text{Code Churn}) \\ Div(d_0, d_2) \sim (LOC + \text{Project Domain} + \text{Commit Count}) + (\text{Priority} + \text{Resolution Days}) \\ Div(d_0, d_3) \sim (LOC + \text{Project Domain} + \text{Commit Count}) + (\text{Priority} + \text{Resolution Days} + \text{Code Churn}) \end{cases} \quad (2)$$

The representativeness score is a measure to evaluate how representative the sample is from the population. There is a descriptive theory of benchmarking with three components, including, motivating comparison, task sample, and performance measures. It was highlighted that "tests in the benchmark should be a representative sample of the tasks that the tool or technique is expected to solve in actual practice." To meet the representativeness criteria in data selection, Equation 3 is defined including both the similarity distance measure along different bug dimensions and the effect size measure are used to determine the representativeness score $Rep(d_0; d_i)$ between the benchmark bugs and the three components of the bug fix population. To determine the similarity distance of two distributions, the values in the three bug dimensions (i.e., bug priority, bug resolution days, and code churn for fixing a bug) are first binned. For example, bugs with their resolution between 0 and 10 days are in Bin 1 of the resolution days dimension, and bugs with their resolution between 10 and 100 days are in Bin 2, and so on. Therefore, each sample in $d_i$ belongs to either of these bins. For instance, $d_3$ has a bin configuration that is defined as:

[PRIORITY]–[RESOLUTION DAYS]–[CODE CHURN],

Based on the above, [MAJOR]–[2]–[1] means that a bug has the priority of "MAJOR", is in Bin 2 of the resolution days dimension (i.e., with resolution in the 10-100 days range), and is in Bin 1 of the code churn dimension (i.e., with code churn value in the 0-10 range). A representative collection of samples has a similar bin distribution as all the bug fix activities. Based on the concept of feature crosses that is used in the machine learning, the cosine similarity of the bin distribution is calculated between the bug samples and $d_i$ (i=1-3) to evaluate whether the samples can represent all the bug fix activities in all the three dimensions of bug fix characteristics. In addition, the effect size of the bug distributions along the three dimensions is calculated between the sampled bugs and the bug population, and aggregate the effect size measure to further evaluate how the bug samples can represent the bug fix activities.

$$\begin{cases} Rep(d_0, d_1) = c(d_0, d_1) \times |1 - \delta_{Code\,Churn}(d_0, d_1)| \\ Rep(d_0, d_2) = c(d_0, d_2) \times |1 - \delta_{Priority}(d_0, d_2)| \times |1 - \delta_{Resolution\,Days}(d_0, d_2)| \\ Rep(d_0, d_3) = c(d_0, d_3) \times |1 - \delta_{Priority}(d_0, d_3)| \times |1 - \delta_{Resolution\,Days}(d_0, d_3)| \times |1 - \delta_{Code\,Churn}(d_0, d_1)| \end{cases} \quad (3)$$

To illustrate the calculation of both the diversity score and the representativeness score, an example between $d_0$ and $d_3$ is defined below. A diversity score of 1 for $Div(d_0; d_3)$ indicates that the sampled bugs can diversely cover 100% of the space spanned by the population, while a low (e.g., close to 0) value of $Div(d_0; d_3)$ indicates that the sampled bugs poorly cover the population in terms of the studied dimensions. A representativeness score of 1 for $Rep(d_0; d_3)$ indicates a similarity distance of 1 with the sampled bugs representing the full population in terms of the bin configurations. In addition, the Cliff Delta value is 0 for measuring the effect size, suggesting that the sampled bugs and their associated population have the same distribution. A Cliff Delta value is a measure of how often the values in a first distribution are larger than the values in a second distribution.

The diversity scores of two BUSes are determined to evaluate how diverse they are in terms of the studied software development project or software bug dimensions. The representativeness score of two BUSes is also determined in order to evaluate how representative they are in terms of the studied bug dimensions.

TABLE 3 depicts the diversity and representativeness score of two BUSes.

TABLE 3

|  | Defects4J | Bugs.jar |
| --- | --- | --- |
| $Div(d_0; d_i)$ | 0.35/0.10/0.07 | 0.89/0.85/0.80 |
| $Rep(d_0; d_i)$ | 0.47/0.76/0.72 | 0.32/0.66/0.62 |
| $cos(d_0; d_i)$ | 0.76/0.96/0.90 | 0.71/0.92/0.91 |

The diversity and representativeness biases are evaluated as follows:

For the diversity assessment, Bugs.jar reaches a diversity score of 0.8 to the fixed bugs that can be linked to bug fix commits, while Defects4J reaches a diversity score of 0.07 only. In general, Bugs.jar can cover a more diverse sample to each one of the three components of bug fix activities compared with Defects4J. Throughout the benchmark creation processes, the bugs in the benchmarks are less diverse in covering the fixed bugs that can be linked (i.e., $d_3$) than covering those bug fix activities that are not linked (i.e., $d_1$ and $d_2$).

For the representativeness assessment, Bugs.jar reaches a representativeness score of 0.62 to the fixed bugs that can be linked to bug fix commits, while Defects4J reaches a higher representativeness score of 0.72. In general, Bugs.jar covers a less representative sample to each one of the three components of bug fix activities compared with Defects4J. Findings support that based on definitions for diversity (being roughly of equal size) and representativeness (being proportional), diversity and representativeness are orthogonal concepts and a highly diverse sample does not guarantee high representativeness or vice versa. Throughout the benchmark creation processes, the bugs in the benchmarks are less representative in covering the fixed bugs that can be linked (i.e., $d_3$) than covering fixed bugs that are not linked (i.e., $d_2$), while more representative in covering $d_3$ than covering $d_1$. It should be noted that the similarity distance $cos(d_0; d_i)$ in TABLE 3 also shows a similar trend in assessing the representativeness, although it is a coarser measure.

Benchmarks are widely used in different areas of software engineering. It is desired that successful benchmarks have a level or property of relevance. It is desired that a benchmark be representative of the systems in a natural setting, but this aspect may be difficult to satisfy. According to embodiments, the concept of relevance in measuring representativeness is extended, together with the concept of sample coverage in measuring diversity, in order to determine a combined measure of both diversity and representativeness (e.g., benchmark coverage) in the benchmarking process. This genetic method, (for example a method for solving both constrained and unconstrained optimization problems based on a selection process that mimics biological evolution) approach can be applied to other domains (e.g., software testing benchmarks, or code clone benchmarks). Therefore, the creation of benchmarks in other domains can leverage the method of the instant application to determine and optimize the coverage of specific benchmarks in resembling the population of the studied systems in the nature setting.

The instant application further may define a new method of bug fix characterization because of the extensibility and flexibility of the generalization of benchmarks. Additional dimensions may be added to include other bug fix characteristics, depending on the context of bug fix requirements and evaluation. It can be desired to gain a deep understanding of the context of bug fixing, and methods as defined herein may provide a means for selecting bugs based on a variety of parameters including interest of bug characteristics. For example, 27 bug fix patterns have been identified in Java software, including in the method call with different actual parameter values, and change in 'if' condition. Embodiments of the present disclosure may define how different bug fix patterns are retained in collected data and further alleviate the generalizability issue in the studied data, leading to a bug fix coverage without missing certain bug fix patterns or a coverage with unrealistic distributions that may not represent real-world bug fixes. Using the method of the instant application, the generalizability assessment of bug fix datasets along extensible dimensions may be concretely defined and gauged. Furthermore, actionable suggestions may be provided to make the decision whether additional bug fix sample are required to cover additional bug fix patterns.

Figure 4:
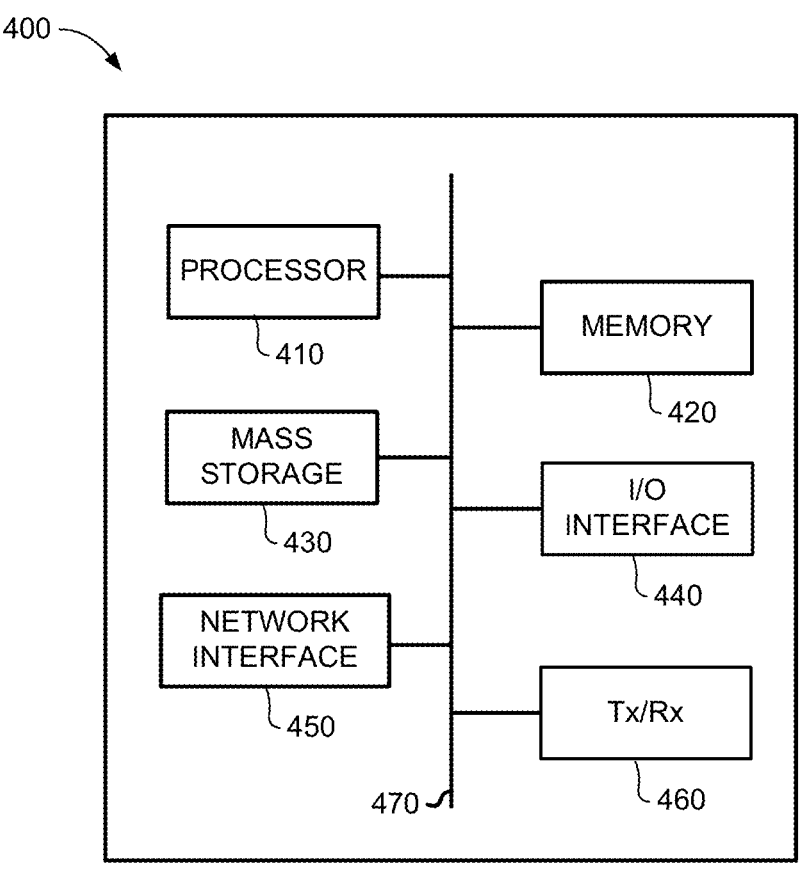
FIG. 4 depicts a block diagram of a user equipment used for implementing methods disclosed herein, according to embodiments of the present disclosure.

FIG. 4 is a schematic diagram of an electronic device 400 that may perform any or all of the steps of the above methods and features described herein, according to different embodiments of the present disclosure. For example, the electronic device can be configured to assess the generalizability of a benchmark. The electronic device may be configured to select a benchmark for assessment and identify a generalizability bias in the selected benchmark. The electronic device may be further configured to determine a generalizability assessment for the selected benchmark based on the identified generalizability bias. In addition, the electronic device can be further configured to, based on the determined generalizability, determine the generalizability of the selected benchmark. The electronic device 400 can be configure, for example, a user equipment (UE), base transceiver station (BTS), base station, wireless gateway or mobility router may be configured as the electronic device. It may be noted that the term "BTS" or "base station" refers to an evolved NodeB (eNB), New Radio (NR) or next generation NodeB (gNodeB or gNB), a radio access node, or another device in a wireless communication network infrastructure, such as a long term evolution (LTE) infrastructure, NR or 5G infrastructure, which performs or directs at least some aspects of wireless communication with wireless communication devices. The term "UE" refers to a device, such as a mobile device, machine-type-communication (MTC) device, machine-to-machine (M2M) equipment, Internet of Things (IoT) device, Internet of Vehicles (IoV) device or other device, which accesses the wireless communication network infrastructure via wireless communication with a base station.

As shown, the device includes a processor 410, memory 420, non-transitory mass storage 430, I/O interface 440, network interface 450, and a transceiver 460, all of which are communicatively coupled via bi-directional bus 470. According to certain embodiments, any or all of the depicted elements may be utilized, or only a subset of the elements. Further, the device 400 may contain multiple instances of certain elements, such as multiple processors, memories, or transceivers. Also, elements of the hardware device may be directly coupled to other elements without the bi-directional bus.

The memory 420 may include any type of non-transitory memory such as static random access memory (SRAM), dynamic random access memory (DRAM), synchronous DRAM (SDRAM), read-only memory (ROM), any combination of such, or the like. The mass storage element 430 may include any type of non-transitory storage device, such as a solid state drive, hard disk drive, a magnetic disk drive, an optical disk drive, USB drive, or any computer program product configured to store data and machine executable program code. According to certain embodiments, the memory 420 or mass storage 430 may have recorded thereon statements and instructions executable by the processor 410 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the methods when the computer program product is loaded into memory and executed on the microprocessor of the wireless communication device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A computer-implemented method for assessing a generalizability of a software benchmark, the method comprising:

selecting, by a processor, a benchmark for assessment from a mass storage, the selecting based on one or more predefined search algorithms executed by the processor and freshness of the benchmark;

identifying, by the processor, a generalizability bias in the selected benchmark, the generalizability bias including a diversity bias and a representativeness bias, the identifying including analysis of data characteristics of the benchmark;

computing, by the processor, a generalizability assessment for the selected benchmark, the generalizability assessment generated by executing quantitative measures on data related to the identified generalizability bias, the computing including determining a score of benchmark generalizability including an effect size or a cosine similarity or a combination of the effect size and the cosine similarity;

determining, by the processor, a generalizability of the selected benchmark based on the computed generalizability assessment; and updating the selected benchmark in the mass storage based on the generalizability assessment.

2. The method of claim 1, wherein updating the selected benchmark includes sending a software commit to the selected benchmark based on the generalizability assessment, the software commit based on at least one code repository and at least one report of a software bug.

3. The method of claim 1 wherein selecting the benchmark is further based on a popularity of the selected benchmark.

4. The method of claim 1 wherein identification of the generalizability bias is based on at least one of:

information indicative of the selected benchmark; and information indicative of guidance for use of the selected benchmark.

5. The method of claim 1 wherein identification of the generalizability bias includes at least one of:

defining a diversity measure for the selected benchmark; and defining a representativeness measure for the selected benchmark.

6. The method of claim 1, wherein the quantitative measures are indicative of a measure of benchmark generalizability.

7. The method of claim 1, wherein the quantitative measures include at least one of:

a number of lines of code of a software development project for the selected benchmark;

an application domain of a software development project for the selected benchmark;

a number of commits of a software development project for the selected benchmark;

a priority level of a software bug in the selected benchmark;

a number of days to fix a software bug in the selected benchmark;

a code churn to fix a software bug in the selected benchmark; and a measure of project level or bug level characteristics of interest.

8. A computing device comprising:

a processor;

a mass storage; and a non-transitory computer readable memory having stored instructions which when executed by the processor configure the device to:

select a benchmark for assessment from the mass storage, the selecting based on one or more predefined search algorithms executed by the processor and freshness of the benchmark;

identify a generalizability bias in the selected benchmark, the generalizability bias including a diversity bias and a representativeness bias, the identifying including analysis of data characteristics of the benchmark;

compute a generalizability assessment for the selected benchmark, the generalizability assessment generated by executing quantitative measures on data related to the identified generalizability bias, the computing including determining a score of benchmark generalizability including an effect size or a cosine similarity or a combination of the effect size and the cosine similarity;

determine a generalizability of the selected benchmark based on the computed generalizability assessment; and update the selected benchmark in the mass storage based on the generalizability assessment.

9. The device of claim 8, wherein updating of the selected benchmark includes to send a software commit to the selected benchmark based on the generalizability assessment, the software commit based on at least one code repository and at least one report of a software bug.

10. The device of claim 8 wherein to select the benchmark is further based on a popularity of the selected.

11. The device of claim 8 wherein identification of the generalizability bias is based on at least one of:

information indicative of the selected benchmark; and information indicative of guidance for use of the selected benchmark.

12. The device of claim 8 wherein identification of the generalizability bias includes at least one of:

defining a diversity measure for the selected benchmark; and defining a representativeness measure for the selected benchmark.

13. The device of claim 8, wherein the quantitative measures are indicative of a measure of benchmark generalizability.

14. The device of claim 8, wherein the quantitative measures include at least one of:

a number of lines of code of a software development project for the selected benchmark;

an application domain of a software development project for the selected benchmark;

a number of commits of a software development project for the selected benchmark;

a priority level of a software bug in the selected benchmark;

a number of days to fix a software bug in the selected benchmark;

a code churn to fix a software bug in the selected benchmark; and a measure of project level or bug level characteristics of interest.

* * * * *